US006839719B2

(12) United States Patent
Wallace

(10) Patent No.: US 6,839,719 B2
(45) Date of Patent: Jan. 4, 2005

(54) SYSTEMS AND METHODS FOR REPRESENTING AND EDITING MULTI-DIMENSIONAL DATA

(75) Inventor: Christopher E. Wallace, Edmonton (CA)

(73) Assignee: Time Industrial, Inc., Edmonton (CA)

(*) Notice: Subject to any disclaimer, the term of this patent is extended or adjusted under 35 U.S.C. 154(b) by 0 days.

(21) Appl. No.: 10/147,231

(22) Filed: May 14, 2002

(65) Prior Publication Data

US 2003/0217074 A1 Nov. 20, 2003

(51) Int. Cl.[7] ............................................. G06F 17/30
(52) U.S. Cl. .................. 707/104.1; 707/103; 707/5; 707/4; 707/3; 707/1; 345/4; 345/419
(58) Field of Search ................................. 707/103, 102, 707/3, 4, 5, 104, 1, 100; 345/848, 413, 4, 419

(56) References Cited

U.S. PATENT DOCUMENTS

| | | | | |
|---|---|---|---|---|
| 5,767,854 A | * | 6/1998 | Anwar | 345/848 |
| 5,799,286 A | | 8/1998 | Morgan et al. | |
| 6,049,664 A | | 4/2000 | Dale et al. | |
| 6,167,396 A | * | 12/2000 | Lokken | 707/3 |
| 6,205,447 B1 | * | 3/2001 | Malloy | 707/102 |
| 6,266,094 B1 | * | 7/2001 | Taylor, Jr. | 348/465 |
| 6,272,673 B1 | | 8/2001 | Dale et al. | |
| 6,282,546 B1 | | 8/2001 | Gleichauf et al. | |
| 6,308,166 B1 | | 10/2001 | Breuker et al. | |
| 6,317,750 B1 | * | 11/2001 | Tortolani et al. | 707/103 R |
| 6,363,393 B1 | | 3/2002 | Ribitzky | |
| 6,366,922 B1 | | 4/2002 | Althoff | |
| 6,405,173 B1 | * | 6/2002 | Honarvar et al. | 705/7 |
| 6,408,292 B1 | * | 6/2002 | Bakalash et al. | 707/2 |
| 6,625,611 B1 | * | 9/2003 | Teig et al. | 707/102 |

OTHER PUBLICATIONS

Wang, J. and Bartholomew, C.H., "Preparation and Activity/Selectivity Properties of Borided Cobalt Fischer–Tropsch Catalysts," Proceedings 9th International Congress on Catalysis, Calgary 1988, vol. 2, pp. 813–820.
"An Introduction to OLAP: Multidimensional Terminology and Technology", White Paper, http://www.pilotsw.com/news/olap_white.htm, Pilot Software, 2002.
"Prolog Scheduler", Datasheet, http://www.mps.com/images/PDF/Scheduler.PDF, Meridian Project System, Inc., 2002.
"Prolog Manager", Datasheet, http://www.mps.com/images/PDF?Mnagr_10–22–01.pdf, Meridian Project Systems, Inc., 2002.
"DB2 Product Family Overview", http://www–3.ibm.com/software/data/db2/, IBM, date unknown.
Oracle 9i Database Release 2 Product Family, White Paper, http://www.oracle.com/ip/deploy/database/oracle9i/, Oracle Corp., May 2002.
"Advantage Ingres Enterprise Relational Database", White Paper, http://www3.ca.com/Files/WhitePapers/Advantage_Ingres_white_paper.pdf, Computer Associates International, Inc., Sep. 2001.

* cited by examiner

Primary Examiner—Jean M. Corrielus
(74) Attorney, Agent, or Firm—Fish & Neave LLP

(57) ABSTRACT

Systems and methods for representing, editing, and operating on multi-dimensional data efficiently, compactly, and in real-time with an intuitive graphical user interface without requiring extensive user training are provided. The multi-dimensional data consist of data pertaining to the allocation of labor, equipment, and material to project cost centers in business, educational, non-profit, and governmental organizations. The multi-dimensional data are stored in a multi-dimensional database that is accessed by the graphical user interface. The graphical user interface enables users to manipulate a large amount of data in a limited display area.

44 Claims, 16 Drawing Sheets

Event Viewer

⇦ ⇨ | Saturday, October 13, 2001 ▽ | Crew 1 (Espinosa, K.) ▽ | Weekly Event Entry ▽

| Item | Class | Work | Reference | Unit | Mon 8 | Tue 9 | Wed 10 | Thu 11 | Total |
|---|---|---|---|---|---|---|---|---|---|
| 🔲 EK1549: Espinosa, K. | BM\FM | 🔲 4145\10\1: Unit 1, 2, 3 | | ST | | | 8.0 | 8.0 | 16.0 |
| | | | | OT | | | 2.5 | 2.0 | 4.5 |
| | | | | DT | | | | | |
| | BM\JM | 🔲 4145\10\1 | | HRS | 10.0 | 10.0 | | | |
| | | 🔲 4145\10\4 ⊕ Unit 428 | | HRS | 10.0 | | 10.5 | 10.0 | 10.0 |
| | Item Totals | | | | | | | | 40.5 |
| ⊕ Unit 428 | CRN\20T | | | SBY | 10.0 | 10.0 | 10.0 | 10.0 | 30.0 |
| | | | | REG | | | | | |
| | | 🔲 4145\10\4 | | HRS | 10.0 | 10.0 | | | 10.0 |
| | Item Totals | | | HRS | 10.0 | 10.0 | 10.5 | 10.0 | 40.0 |
| 🔲 SB2501: Smith, D. | BM\JM | 🔲 4145\10\1 | CO#497 | HRS | 20.0 | 20.0 | 20.5 | 20.0 | 80.5 |
| ⊕ Labor Totals (2 items) | | | | | | | | | |
| ⊕ Equipment Totals (1 item) | | | | HRS | 10.0 | 10.0 | 10.0 | 10.0 | 40.0 |

FIG. 4

Event Viewer — 240

| Item | Class | Work | Reference | Unit | Mon 8 | Tue 9 | Wed 10 | Thu 11 | Total |
|---|---|---|---|---|---|---|---|---|---|
| ⊟ EK1549: Espinosa, K. — 245, 250 | BM \ FM | | | ST | | | | | |
| | | | | OT | | | | | |
| Item Totals | | | | HRS | | | | | |
| ⊕ Unit 428 — 255 | CRN \ 20T | | | SBY | | | | | |
| | | | | REG | | | | | |
| Item Totals | | | | HRS | | | | | |
| □ 10" Pipe — 260 | CS\SB\TBE | | | FT | | | | | |
| Item Totals | | | | HRS | | | | | |
| ▤ Subsistence — 265 | LAB\BUR | | | EA | | | | | |
| ⊟ Labor Totals (1 item) | | | | HRS | | | | | |
| ⊕ Equipment Totals (1 item) | | | | HRS | | | | | |
| □ Material Totals (1 item) | | | | FT | | | | | |
| ▤ Expense Totals (1 item) | | | | EA | | | | | |

Weekly Event Entry | Crew 1 (Espinosa, K.) | Saturday, October 13, 2001

FIG. 5

Event Viewer

Saturday, October 13, 2001 | Crew 1 (Espinosa, K.) | Weekly Event Entry

October 2001

| S | M | T | W | T | F | S |
|---|---|---|---|---|---|---|
|   | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |   |   |   |

| Item | Reference | Unit | Mon 8 | Tue 9 | Wed 10 | Thu 11 | Total |
|---|---|---|---|---|---|---|---|
| EK154 Espino... | 1145\10\1: Unit 1, 2, 3 | ST |   |   | 8.0 |   | 8.0 |
|  |  | OT |   |   | 2.5 |   | 2.5 |
|  | 1145\10\1 | DT |   |   |   |   |   |
|  | 1145\10\4 | HRS |   | 10.0 |   |   | 10.0 |
|  |  | HRS | 10.0 |   |   |   | 10.0 |
|  |  | HRS | 10.0 | 10.0 | 10.5 |   | 30.5 |
| Unit 428 | 4145\10\4 | SBY | 10.0 | 10.0 |   |   | 20.0 |
| CRN\20T |  | REG |   |   |   |   |   |
|  |  | HRS | 10.0 |   |   |   | 10.0 |
| Item Totals |  | HRS | 10.0 | 10.0 | 10.0 |   | 30.0 |
| SB2501: | 4145\10\1 | HRS | 10.0 | 10.0 |   |   | 20.0 |
| BM\JM | CO#497 | HRS | 20.0 | 20.0 | 20.5 |   | 60.5 |
| Labor Totals (2 items) |  | HRS | 10.0 | 10.0 | 10.0 |   | 30.0 |
| Equipment Totals (1 item) |  |  |   |   |   |   |   |

FIG. 6

Event Viewer — 300

| Item | Class | Work | Reference | Unit | Daily Event Entry | Weekly Event Entry | Weekly Event Entry Total |
|---|---|---|---|---|---|---|---|
| EK1549: Espinosa, K. | BM\FM | 4145\10\1: Unit 1, 2, 3 | | ST | | 8.0 | 8.0 |
| | | | | OT | | 2.5 | 2.5 |
| | | | | DT | | | |
| | BM\JM | 4145\10\1 | | HRS | 10.0 | | 10.0 |
| | | 4145\10\4 | | HRS | 10.0 | | 10.0 |
| Item Totals | | | | HRS | 10.0 | 10.5 | 30.5 |
| Unit 428 | CRN\20T | | | SBY | | 10.0 | 20.0 |
| | | | | REG | | | |
| | | 4145\10\4 | | HRS | 10.0 | | 10.0 |
| Item Totals | | | | HRS | 10.0 | 10.0 | 30.0 |
| SB2501: | BM\JM | 4145\10\1 | CO#497 | HRS | 20.0 | 20.5 | 20.0 |
| Labor Totals (2 items) | | | | HRS | 20.0 | 20.5 | 60.5 |
| Equipment Totals (1 item) | | | | HRS | 10.0 | 10.0 | 30.0 |

FIG. 7

| Event Viewer | | | | | | | | |
|---|---|---|---|---|---|---|---|---|
| ⇦⇨ Saturday, October 13, 2001 ▽ | | Crew 1 (Espinosa, K.) ▽ | | Weekly Event Entry ▽ | | | | |
| | | | | Mon 8 | Tue 9 | Wed 10 | Thu 11 | Total |
| Item | Class | Work | | | | | | |
| 🯄 EK1549: Espinosa, K. | BM\FM | 🯄 4145\10\1: Unit 1, 2, 3 | ST | | | 8.0 | | 8.0 |
| | | | OT | | | 2.5 | | 2.5 |
| | | | DT | | | | | |
| | BM\JM | 🯄 4145\10\1 | HRS | | 10.0 | | | 10.0 |
| | ⬥Unit 428 | 🯄 4145\10\4 | HRS | 10.0 | | | | 10.0 |
| | Item Totals | | | 10.0 | 10.0 | 10.5 | | 30.5 |
| ⬥Unit 428 | CRN\20T | | SBY | | 10.0 | 10.0 | | 20.0 |
| | | | REG | | | | | |
| | | 🯄 4145\10\4 | HRS | 10.0 | | | | 10.0 |
| | Item Totals | | | 10.0 | 10.0 | 10.0 | | 30.0 |
| 🯄 SB2501: | BM\JM | 🯄 4145\10\1 CO#497 | HRS | 10.0 | 10.0 | | | 20.0 |
| 🯄 Labor Totals (2 items) | | | | 20.0 | 20.0 | 20.5 | | 60.5 |
| ⬥Equipment Totals (1 item) | | | | 10.0 | 10.0 | 10.0 | | 30.0 |

FIG. 8

| Event Viewer | | | | | | | | | |
|---|---|---|---|---|---|---|---|---|---|
| ⇦⇨ Saturday, October 13, 2001 ▽ | Crew 1 (Espinosa, K.) ▽ | | | Weekly Event Entry ▽ | | | | | |
| | | | | | Mon 8 | Tue 9 | Wed 10 | Thu 11 | Total |
| Item | Class | Work | Reference | Unit | | | | | |
| ⊟ EK1549: Espinosa, K. | BM\FM | ▯ 4145\10\1: Unit 1, 2, 3 | | ST | | | 8.0 | | 8.0 |
| | | 370 | 400 | OT | | | 2.5 | | 2.5 |
| | | | | DT | | | | | |
| 395 | | | | | | | | | |
| | | ▯ 4145\10\1 | | HRS | | 10.0 | | | 10.0 |
| | BM\JM | ▯ 4145\10\4 | | HRS | 10.0 | | | | 10.0 |
| | ◆ Unit 428 | | | HRS | 10.0 | 10.0 | 10.5 | | 30.5 |
| | Item Totals | | | SBY | | 10.0 | 10.0 | | 20.0 |
| | CRN\20T | | | REG | | | | | |
| ◆ Unit 428 | | ▯ 4145\10\4 | | HRS | 10.0 | 10.0 | | | 10.0 |
| | Item Totals | | | HRS | 20.0 | 20.0 | 20.5 | | 30.0 |
| ⊟ Labor Totals (2 items) | | | | HRS | 10.0 | 10.0 | 10.0 | | 60.5 |
| ◆ Equipment Totals (1 item) | | | | HRS | 10.0 | 10.0 | 10.0 | | 30.0 |

Event Viewer

⇦⇨ | Saturday, October 13, 2001 ▷ | Crew 1 (Espinosa, K.) ▷ | | | Weekly Event Entry ▷

| Item | Class | Work | Reference | Unit | Mon 8 | Tue 9 | Wed 10 | Thu 11 | Total |
|---|---|---|---|---|---|---|---|---|---|
| EK1549: Espinosa, K. | BM\FM | | | HRS | | 10.0 | | | 10.0 |
| | BM\JM | 4145\1011 | | HRS | 10.0 | | | | 10.0 |
| | | 4145\1014 | | | | | | | |
| | Unit 428 | | | | | | | | 20.0 |
| Item Totals | | | | | | | | | 20.0 |
| Unit 428 | CRN\20T | | | SBY | 10.0 | 10.0 | | | |
| | | | | REG | | | 10.0 | | 10.0 |
| | | 4145\1014 | | HRS | 10.0 | 10.0 | 10.0 | | 30.0 |
| Item Totals | | | | | | | | | |
| SB2501: Smith, B. | BM\JM | 4145\1011 | CO#497 | HRS | 10.0 | 10.0 | | | 20.0 |
| | | 4145\1014 | | ST | | | | | |
| | | | | OT | | | | | |
| Labor Totals (2 items) | | | | HRS | 20.0 | 20.0 | | | 40 |
| Equipment Totals (1 item) | | | | HRS | 10.0 | 10.0 | 10.0 | | 30.0 |

Event Viewer — 515

◁▷ Saturday, October 13, 2001 ▽ | Crew 1 (Espinosa, K.) ▽ | Weekly Event Entry ▽

| Item | Class | Work | Reference | Unit | Mon 8 | Tue 9 | Wed 10 | Thu 11 | Total |
|---|---|---|---|---|---|---|---|---|---|
| 🗑 EK1549: Espinosa, K. | BM\FM | 🗎 4145\10\1: Unit 1, 2, 3 | | ST | | | 8.0 | | 8.0 |
| | | | | OT | | | 2.5 | | 2.5 |
| | | | | DT | | | | | |
| | BM\JM | 🗎 4145\10\1 | | HRS | | 10.0 | | | 10.0 |
| | | 🗎 4145\10\1 4 | | HRS | 10.0 | | | | 10.0 |
| | ◆ Unit 428 | | | HRS | 10.0 | 10.0 | 10.5 | | 30.5 |
| | Item Totals | | | | | | | | |
| ◆ Unit 428 | CRN\20T | | | SBY | | 10.0 | 10.0 | 10.0 | 30.0 |
| | | | | REG | | | | | |
| | | 🗎 4145\10\1 4 | | HRS | 10.0 | | | | 10.0 |
| | Item Totals | | | HRS | 10.0 | 10.0 | 10.0 | 10.0 | 40.0 |
| 🗑 SB2501: | BM\JM | 🗎 4145\10\1 1 | CO#497 | HRS | 20.0 | 20.0 | 10.5 | | 30.5 |
| 🗑 Labor Totals (2 items) | | | | HRS | 10.0 | 10.0 | 10.0 | 10.0 | 40.0 |
| ◆ Equipment Totals (1 item) | | | | | | | | | |

510 → (pointing to "10.0" at Thu 11 row for Unit 428)

FIG. 16

SYSTEMS AND METHODS FOR REPRESENTING AND EDITING MULTI-DIMENSIONAL DATA

FIELD OF THE INVENTION

This invention relates generally to real-time data structures for managing multi-dimensional data. More specifically, the present invention provides systems and methods for representing, editing, and operating on multi-dimensional data efficiently without requiring extensive user training.

BACKGROUND OF THE INVENTION

The advent of the Internet and Information Technology ("IT") has revolutionized the way business is conducted around the world. Business organizations have adopted these technologies to organize their structure, work flow and business relationships and to make their business processes increasingly more efficient. In particular, these technologies have become instrumental in enabling business organizations to manage the large amount of data transacted by them on a daily basis.

Efforts to optimize a wide variety of business processes have led business organizations to demand an increased granularity and complexity in the data that is input into their information systems. The data generated by a given business organization is typically stored in various databases across the business organization's information systems. A database is a collection of data that is organized so that its contents may be easily accessed, managed, and updated. The data stored in a database and the algorithms used to manipulate the data are represented in computer memory by a data structure, such as a queue, linked list, stack, heap, tree, or hash table, among others.

The most prevalent type of database is the relational database, organized as a set of formally-described tables from which data may be accessed or reassembled in many different ways without having to reorganize the tables. Each table, also referred to as a relation, contains one or more data categories in columns. Each row in the table contains a unique instance of data for the categories defined by the columns. For example, an electronic commerce web site such as Amazon.com, of Seattle, Calif., may have a relational database to describe customers' orders. The relational database may include a table to store customers' personal information with columns for the customers' name, address, and credit card, and another table to describe the order itself, with columns for the product bought, its price and quantity. The rows in the tables would contain the instance of information for a particular customer and customer's order.

Data may be queried from a database using a standard application program interface called Structured Query Language ("SQL"). SQL enables an user to select, insert, delete, update, and find out the location of data, among other data operations. The user may specify SQL statements to manipulate data in a database as part of a relational database management system ("RDBMS"), which is a technology platform, set of services, or application for creating, updating, and administering a relational database. Examples of commercially available RDBMSs include DB2, sold by IBM Corporation, of White Plains, N.Y., Oracle 9i Database, sold by Oracle Corporation, of Redwood Shores, Calif., and OpenIngres, sold by Computer Associates International, Inc., of Islandia, N.Y. Alternatively, business organizations may use spreadsheet software applications such as Excel, sold by Microsoft Corporation, of Redmond, Wash., to emulate a RDBMS.

Business organizations often use commercially available RDBMSs to manage databases storing their customer, supplier, and internal data such as accounting and financial information, employees' records, inventory, and legal records, among others. Additionally, business organizations in industries such as construction and manufacturing may require more specialized RDBMSs to manage activity-based costing data involving various business activities and the determination of costs and cost drivers for each activity. An example of activity-based costing data includes the material and labor costs of a construction unit or the costs generated by a given purchase order or machine use. Commercially-available activity-based costing RDBMSs include Prolog Manager and Prolog Scheduler, sold by Meridian Project Systems, Inc., of Folsom, Calif., and the OneWorld software package, sold by J. D. Edwards & Company, of Denver, Colo.

A primary function of these activity-based costing systems is to highlight variances between actual costs and budgeted costs on an ongoing basis. To ensure accurate and consistent calculation of actual costs, these systems implement database queries that require the consideration of a large number of variables. These variables can include resource identification and classification, project, phase and task references, cost code references, and date and time, among others. Transactions that drive the calculation of actual costs in these systems must accurately record each of these variables in order to generate the correct results.

Using RDBMSs for such diverse purposes requires business organizations to invest a considerable amount of resources to train IT staff to manage the databases. Few of the RDBMSs available today allow an unsophisticated IT staff member to enter, view, and maintain multi-dimensional data efficiently and with a minimum of training. Multi-dimensional data consist of multiple data records that share a common field value. For example, in a customer database for an electronic commerce web site such as Amazon.com, of Seattle, Wash., the field "customer phone number" may be associated with multiple phone number records such as a home phone number, a work phone number, and a cellular phone number. While multi-dimensional data can be stored in a relational database, such data is more suitably stored in a multi-dimensional database that organizes the data according to their dimension. In the customer database example, a relational database would represent the different phone numbers by repeating the customer phone number field for each phone number record so that each phone number record would be in a different row in the table. In contrast, a multi-dimensional database would have a single row for the customer phone number field and multiple cells corresponding to the different phone number types, i.e., home, work, and cellular extending along a dimension that is logically orthogonal to the row/column dimensions of a standard table. Each multi-dimensional database is implemented to handle large amounts of data that are organized and queried in numerous ways, requiring the IT staff to create complex SQL programs to manipulate the data.

Additionally, the user interfaces provided with such RDBMSs are predominantly text based, have limited display areas, and require considerable training before an IT staff member can become proficient in their use. For example, activity-based costing RDBMSs become increasingly inefficient when the raw data contains many variables, or the resources are frequently applied to more than one activity within a recording period. The most efficient activity-based costing RDBMSs capture raw data in tables where each row represents one or more transactions and each column records or summarizes a different variable. Every time a variable changes value, either a new row is added to the table or another user interface screen is opened to show a details table wherein a new variable detail row is added.

To conserve display space, variable values are often represented using a shorthand code that is often numeric and non-descriptive, which leads to a cryptic display that is meaningless to IT staff members not familiar with the coding conventions. And despite this abbreviated representation technique, most solutions still require horizontal scrolling in the user interface to display all of the variables required by the transaction. Finally, given the repetitiveness of variables between rows, considerable time is spent entering repeated values and determining which variables are unique to a given row.

As a result of these difficulties with existing RDBMSs, several business organizations have elected to utilize expensive and specialized intermediaries to collect and transpose data into their information systems. The intermediaries function as applications service providers ("ASPs") to enable the business organization to outsource its IT needs with the goal of minimizing the complications its own IT staff has to deal with when managing a RDBMS. Such an arrangement may be attractive for smaller organizations with limited IT resources or for larger organizations not interested in maintaining a large in-house IT staff. In both cases, however, the business organizations are still required to train employees to use the often cryptic and cumbersome user interfaces designed by the ASPs to manage the organizations' data. The same training and user interface difficulties found in commercially available RDBMSs are encountered with the solutions provided by ASPs. Furthermore, it may be more expensive for a business organization to outsource its IT database needs to an ASP than to purchase an off-the-shelf RDBMS due to the high consulting fees charged by the ASP to train a business organization's employee to use the ASP system.

Efficiently solving these database management difficulties requires building a RDBMS with a user interface that optimally uses a limited amount of display area to present information such that an IT staff member or other user is not required to navigate within or between large numbers of data entry screens to enter or view information. The interface should intuitively display information such that an unsophisticated user can be trained to use the RDBMS in a relatively short period of time. Additionally, to be as efficient as possible, the RDBMS must also recognize and capitalize upon opportunities to take advantage of as many data entry patterns as can be effectively automated.

In view of the foregoing, it would be desirable to provide systems and methods for representing, editing, and operating on multi-dimensional data efficiently without requiring extensive user training.

It further would be desirable to provide systems and methods for representing, editing, and operating on multi-dimensional data in a limited display area with graphical icons that identify different data units.

It also would be desirable to provide systems and methods for representing, editing, and operating on multi-dimensional data in a compact form by constraining data entered in a table to be within a given data context.

It also would be desirable to provide systems and methods for representing, editing, and operating on multi-dimensional data in a compact form so that there is no display repetition of multi-dimensional data in a given table.

SUMMARY OF THE INVENTION

In view of the foregoing, it is an object of the present invention to provide systems and methods for representing, editing, and operating on multi-dimensional data efficiently without requiring extensive user training.

It is a further object of the present invention to provide systems and methods for representing, editing, and operating on multi-dimensional data in a limited display area with graphical icons that identify different data units.

It is also an object of the present invention to provide systems and methods for representing, editing, and operating on multi-dimensional data in a compact form by constraining data entered in a table to be within a given data context.

It is also an object of the present invention to provide systems and methods for representing, editing, and operating on multi-dimensional data in a compact form by constraining data entered in a table so that there is no display repetition of multi-dimensional data in a given table.

These and other objects of the present invention are accomplished by providing systems and methods for representing, editing, and operating on multi-dimensional data efficiently, compactly, and in real time with an intuitive graphical user interface ("GUI"). The multi-dimensional data is stored in a multi-dimensional database ("MDB") that is accessed by the GUI. Both the MDB and GUI are platform-independent and may be implemented using different programming languages, operating systems, and hardware. The MDB and GUI may be offered as a service by an ASP or as an off-the-shelf RDBMS.

In a preferred embodiment, multi-dimensional data is represented with a composite tree data structure. The tree root and fundamental data element that is input, managed, and rendered is referred to as an event. An event is used to describe the association of a specific context with a specific date, time, and quantity. The context of an event is described by assigning values into a fixed set of reference variables called dimensions. Context dimensions may consist of an item, class, work, reference, and unit, among others. Frequently used dimension values are organized into workgroups. Different combinations of item, class, work, reference, and unit can be saved and assigned a descriptive workgroup name so that they can be conveniently recalled by an user using a simple GUI navigational control. Additionally, easily recognizable graphical icons are used to represent different items to facilitate user's management of multi-dimensional data.

A business organization may use the composite data structure to record and manage data that are significant to various monitoring and control functions within one or more related business entities. For example, an event corresponding to a specific assembling task performed by a manufacturing employee might describe the time the employee spent to assemble a given quantity of auto parts. In this example, the specific employee and task references define the event's context, while the quantity of parts assembled represents the event's quantity. The context's item may indicate that the event refers to a labor component of the manufacturing process, the context's class may indicate that the labor component was part of the assembly team, the context's sub-item may indicate that the assembly team used a certain equipment to assemble the auto parts, the context's work may indicate that work was performed on the electrical components of a specific auto model, and the context's unit may indicate the quantity of parts that were assembled.

The functionality for rendering and recording event information is implemented in an Event Viewer Module ("EVM") in the GUI. The EVM enables an user to add or remove values within contextual dimensions and enter or delete quantities associated with a context. The user may edit and review events for arbitrary periods of time using simple GUI navigational controls. Event edits may be automatically or manually saved into the MDB associated with the GUI.

Advantageously, the systems and methods of the present invention enable a business organization to represent, edit, and operate on multi-dimensional data efficiently, compactly, and in real-time without requiring extensive user training. In addition, the systems and methods of the present invention also enable a business organization to manipulate multi-dimensional data in a limited display area using an intuitive GUI. Users may manage a large amount of data by interacting with the EVM in the GUI without having to create complex SQL queries commonly used in prior art RDBMSs or without having to become proficient in the often cumbersome and cryptic text-based GUIs of an RDBMS solution provided by an ASP.

BRIEF DESCRIPTION OF THE DRAWINGS

The foregoing and other objects of the present invention will be apparent upon consideration of the following detailed description, taken in conjunction with the accompanying drawings, in which like reference characters refer to like parts throughout, and in which:

FIG. 4 is an exemplary view of a GUI screen shot showing the display of an EVM designed in accordance with the principles of the present invention;

FIG. 5 is an exemplary view of a GUI screen shot showing the display of an EVM with graphical icons for four different items;

FIG. 6 is an exemplary view of EVM navigational controls for selecting dates;

FIG. 7 is an exemplary view of EVM navigational controls for selecting different views for dates;

FIG. 8 is an exemplary view of EVM navigational controls for selecting workgroups;

FIG. 11 is an exemplary view of an EVM display for adding a new contextual dimension value;

FIG. 12 is an exemplary view of an EVM display for selecting different objects returned from a MDB query;

FIG. 14 is an exemplary view of an EVM display for removing a contextual dimension value;

FIG. 16 is an exemplary view of an EVM display for entering a new quantity.

DETAILED DESCRIPTION OF THE INVENTION

Figure 1:
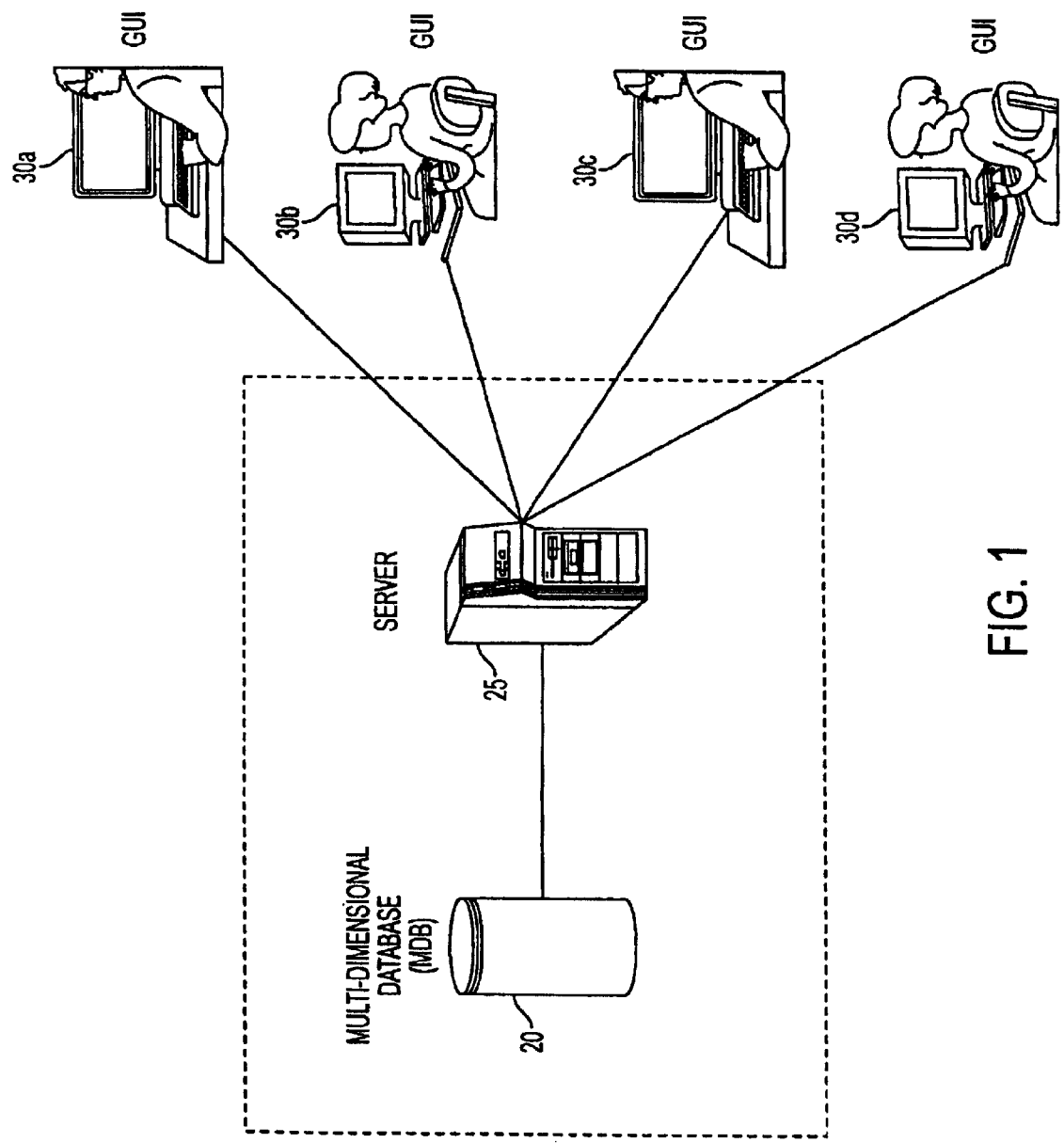
FIG. 1 is a schematic diagram of the network environment in which the systems and methods of the present invention operate.

Referring to FIG. 1, a schematic diagram of the network environment in which the systems and methods of the present invention operate is described. Multidimensional database ("MDB") 20 is a multi-dimensional database for storing multi-dimensional data having many variables or dimensions. As used herein, the multi-dimensional data consist of data transacted by a business, educational, non-profit, or governmental organization. In a preferred embodiment, MDB 20 contains a variety of tables, with each table containing one or more data categories or fields in its columns. Each row in the table contains multiple instances of data for the categories defined by the columns. For example, an automobile manufacturer such as Ford Motor Company, of Dearborn, Mich., may use MDB 20 to include a table to store employee information of Ford's SUV division, a table to store employee information of Ford's truck division, and a table to store SUV and truck inventory information on a quarterly basis.

Data stored in MDB 20 is represented in computer memory by a data structure such as a queue, linked list, stack, heap, tree, or hash table, among others. In a preferred embodiment, data stored in MDB 20 is represented by a composite tree data structure as described below. Data stored in MDB 20 is accessed by IT staff members or other users in a business, educational, non-profit, or governmental organization by using graphical user interfaces ("GUI") 30a–d.

GUIs 30a–d access data in MDB 20 through server 25. Server 25 and MDB 20 may be a part of the organization's information systems or maintained by an external ASP. In the first case, the organization may pay for purchasing, licensing, and/or maintenance fees of the hardware and software required by MDB 20 and GUIs 30a–d. In the second case, the organization may pay for the installation, maintenance, and consulting fees charged by the ASP as well as for service fees accrued when the organization's IT staff members and users interact with GUIs 30a–d to enter, view, and maintain data on MDB 20.

Training for the organization's IT staff members and users is kept at a minimum as a result of the intuitive, efficient, and compact design of MDB 20 and GUIs 30a–d. Both MDB 20 and GUIs 30a–d are platform-independent and may be implemented using different programming languages, operating systems, and hardware. It should be understood by one skilled in the art that MDB 20 and server 25 may comprise additional MDBs and servers located within the business organization's information systems or in the ASP.

Figure 2:
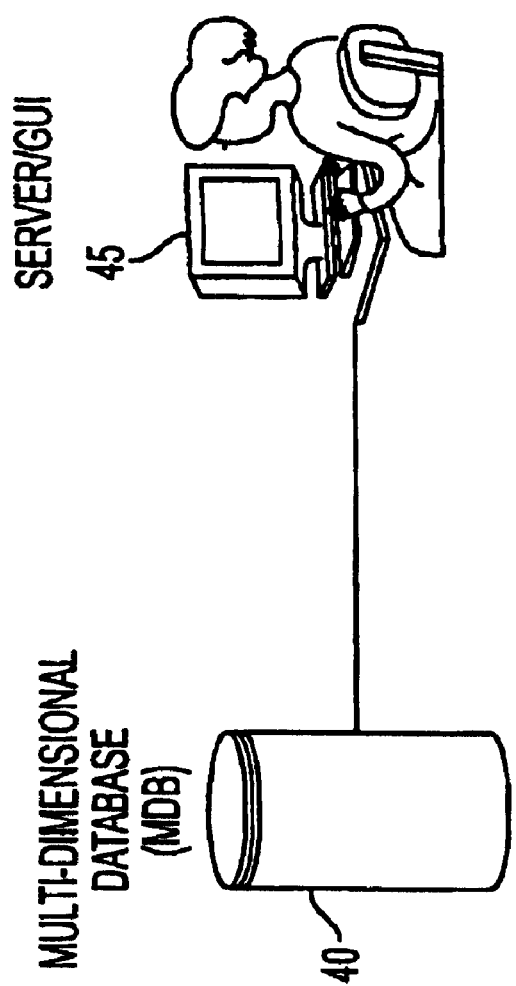
FIG. 2 is a schematic diagram of an alternative network environment in which the systems and methods of the present invention operate.

Referring now to FIG. 2, a schematic diagram of an alternative embodiment of a network environment in which the systems and methods of the present invention operate is described. In this alternative embodiment, GUI 45 is accessed directly on a server that connects to MDB 40. This alternative may be used in smaller organizations with lower IT budgets. It should be understood by one skilled in the art that GUI 45 may be installed on one or more computers that function as servers to enter and maintain data stored in MDB 40.

Figure 3:
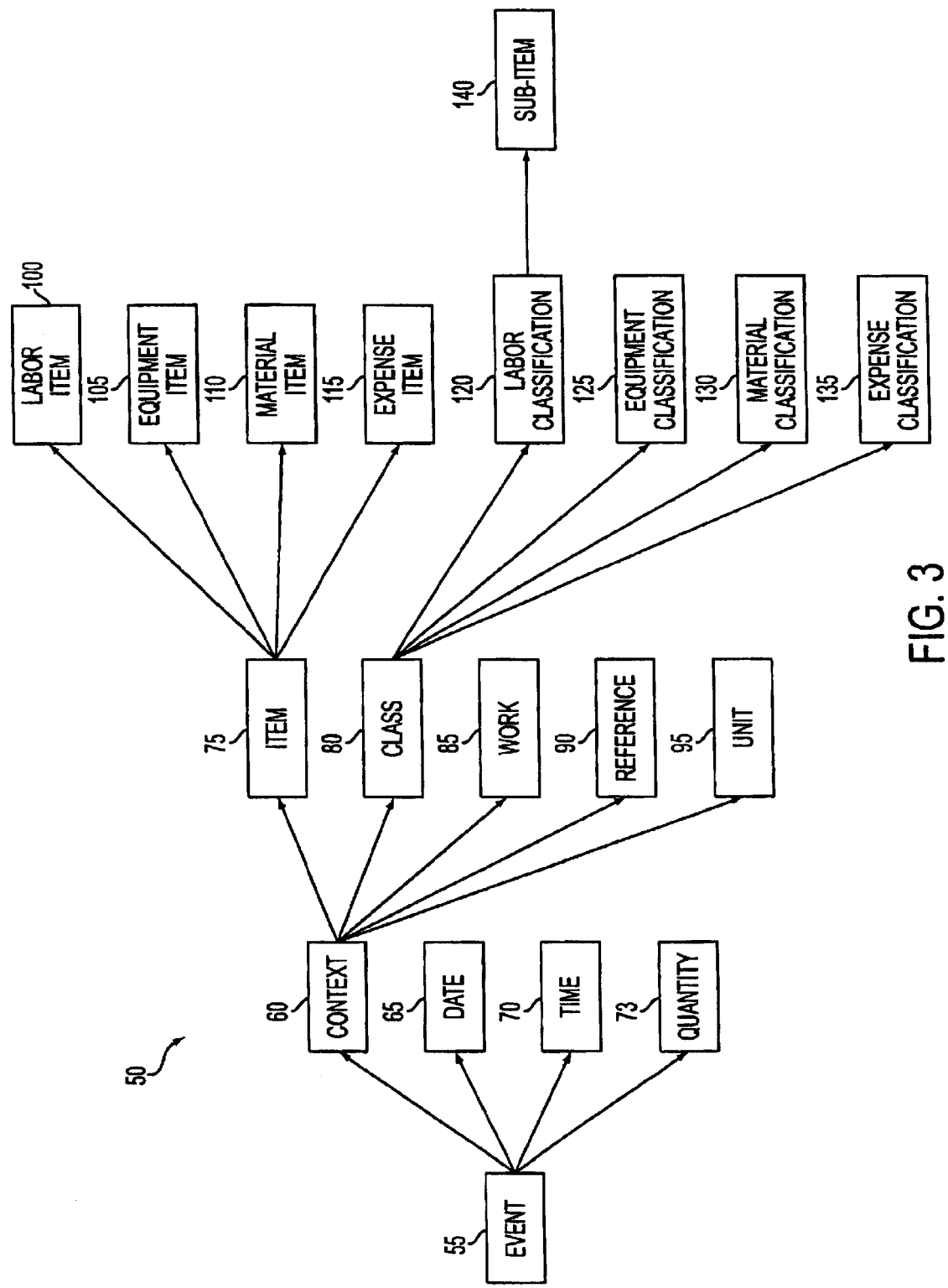
FIG. 3 is an exemplary composite tree data structure to represent multi-dimensional data in accordance with the principles of the present invention.

Referring now to FIG. 3, an exemplary composite tree data structure to represent multi-dimensional data in accordance with the principles of the present invention is described. Data structure 50 is an exemplary composite tree data structure used to represent multi-dimensional data pertaining to the allocation of labor, equipment, and material to project cost centers in business, educational, non-profit, and governmental organizations. Data structure 50 may be used, for example, by a construction contractor to track costs for various constructions projects, by a university to track costs for a research study, or by a local government to track costs for community projects.

The fundamental data element of data structure 50 that is input or entered in the MDB, manipulated by a user, and rendered or displayed in the GUI is event 55. Event 55 is the root of tree data structure 50, and is further represented by context 60, date 65, time 70, and quantity 73. Context 60 of event 55 is described by assigning values into a fixed set of reference variables called dimensions, date 65 is described by assigning a single value into a date variable, time 70 is described by assigning a single value into a time variable, and the quantity is described by assigning a single value into a numeric variable. Context 60 dimensions consist of five variables, namely: (1) item variable 75; (2) class variable 80; (3) work variable 85; (4) reference variable 90; and (5) unit variable 95.

In the construction contractor example above, event 55 may be used to describe the time an employee spent working on a house being renovated by the contractor. In this example, the specific employee and task define event 55's contextual dimensions while the value of time 70 represents event 55's quantity. Item variable 75 may represent the employee, class variable 80 may identify the employee as a painter, work variable 85 may specify work done on the exterior part of the house, reference variable 90 may identify the house with a reference code, and unit variable 95 may specify that the time spent by the employee on the particular task was during regular business hours.

Different combinations of item variable 75, class variable 80, work variable 85, reference variable 90, and unit variable 95 may be saved and assigned a descriptive workgroup name so that they can be conveniently recalled by an user using a simple GUI navigational control within the GUI. In the construction contractor example, a workgroup may be used to identify all the painters working for the contractor. Additionally, easily recognizable graphical icons are used to represent item variable 75 to facilitate user's management of multi-dimensional data.

The functionality for rendering and recording event information is implemented in an Event Viewer Module ("EVM") in the GUI. The EVM enables an user to add or remove values within contextual dimensions and enter or delete quantities associated with context 60. The user may edit and review event 55 for arbitrary periods of time using simple GUI navigational controls. Edits on event 55 may be automatically or manually saved into the MDB associated with the GUI.

Item 75 variable is categorized into four item types, namely, labor item 100, equipment item 105, material item 110, and expense item 115. In the construction contractor example, labor item 100 may represent an employee, equipment item 105 may represent an equipment used by the employee to perform a particular task, material item 110 may represent the material used by the employee in performing the task, and expense item 115 may represent subsistence expenses such as food, transportation, etc., allocated to the employee during a workday.

Class variable 80 is categorized into labor classification 120, equipment classification 125, material classification 130, and expense classification 135. Further, labor classification 120 may have optional sub-item 140 to indicate additional items such as equipment item 105, material item 110, or expense item 115 pertaining to labor classification 120. If the value of item variable 75 corresponds to labor item 100, then the value of class variable 80 may only correspond to labor classification 120. Similarly, if the value of item variable 75 corresponds to equipment item 105, material item 110, or expense item 115, then the value of class variable 80 may only correspond to equipment classification 125, material classification 130, or expense classification 135, respectively.

In the construction contractor example, labor classification 120 may indicate the type of construction work performed by an employee, such as painting, plumbing, and electrical, among others. Equipment classification 125 may indicate the type of equipment used, material classification 130 may indicate the type of material used, and expense classification 135 may indicate the class of expenses expense item 115 falls into.

It should be understood by one skilled in the art that tree data structure 50 may have other tree branches not shown in FIG. 3. For example, tree data structure 50 may have context dimensions that correspond to activity-based costing functions specific to business, educational, non-profit, or governmental organizations. Additionally, it should be understood by one skilled in the art that tree data structure 50 may represent its tree root by a fundamental data element other than event 55.

Referring now to FIG. 4, an exemplary view of a GUI screen shot showing the display of an EVM designed in accordance with the principles of the present invention is described. EVM display 145 implements the functionality for rendering and recording information about event 55. EVM display 145 shows a main screen that is divided into six discrete areas: (1) fixed area 150; (2) fixed header 170; (3) fixed footer 190; (4) vertically scrolling area 210; (5) vertically and horizontally scrollable area 215; and (6) vertically scrollable area 220. The design of EVM display 145 into these six discrete areas enables an IT staff member or other user to operate on multi-dimensional data in a limited display area efficiently, compactly, and in real-time without requiring extensive user training.

Fixed area 150 implements control 155 for navigating between date ranges, control 160 for selecting workgroups, and control 165 for selecting date view configurations. Below fixed area 150 is fixed header 170 that has nonscrolling area 175 on the left to display static dimension column labels, horizontally scrolling area 180 in the center that displays dynamic date column labels, and nonscrolling area 185 on the right that displays a static total column label.

At the bottom of the main screen is fixed footer 190 that has nonscrolling area 195 on the left that displays dynamic row labels, horizontally scrolling area 200 in the center that displays dynamic calculated totals for each date column and footer row, and nonscrolling area 205 on the right that displays dynamically calculated totals for the totals column and for each footer row.

At the left of the screen is vertically scrolling area 210 that displays the values of contextual variables and static rows for displaying subtotal row labels. In the center of the screen is vertically and horizontally scrollable area 215 that displays the values of quantity variables and dynamic calculated subtotal rows. Finally, at the right of the screen is vertically scrollable area 220 that displays dynamic calculated totals for each row of quantity variables in center area 215.

Context 60 dimensions item variable 75, class variable 80, work variable 85, reference variable 90, and unit variable 95 are respectively displayed in columns 225a–e entitled "Item", "Class", "Work", "Reference", and "Unit" in nonscrolling area 175. Each cell in item column 225a represents the value of item variable 75 using the combination of an icon and a textual description, such as icon 230 and textual description 235. The values of item variable 75 in item column 225a are constrained such that they may only contain references to labor item 100, equipment item 105, material item 110, or expense item 115 that respectively correspond to labor classification 120, equipment classification 125, material classification 130, or expense classification 135 that are entered in class column 225b. The values of item variable 75 are further constrained such that the same value cannot be repeated within item column 225a.

Referring now to FIG. 5, an exemplary view of a GUI screen shot showing the display of an EVM with graphical icons for four different items is described. EVM display 240 shows four values of item variable 75 in item column 245. The four values are represented by distinct graphical icons to facilitate users' view and management of multi-dimensional data. Graphical icon 250 is used to identify item variable 75 as labor item 100, graphical icon 255 is used to identify item variable 75 as equipment item 105, graphical icon 260 is used to identify item variable 75 as material item 110, and graphical icon 265 is used to identify item variable 75 as expense item 115.

It should be understood by one skilled in the art that graphical icons 250, 255, 260, and 265 are used for the purposes of illustration only. Different graphical icons than the ones shown in FIG. 5 may be used to represent different item variables, and additional graphical icons may be used to facilitate users' view of multi-dimensional data in a given EVM display.

Referring back to FIG. 4, each cell in class column 225b represents the value of class variable 80 using a textual description, such as textual description 270. Textual description 270 may, for example, refer to a boilermaker ("BM") and foreman ("FM"). The values of class variable 80 in class column 225b are constrained such that they may only contain references to labor classification 120, equipment classification 125, material classification 130, or expense classification 135. The values of class variable 80 are also constrained such that the same value cannot be repeated within the set of cells that is to the right of a cell in item column 225a.

As mentioned above, the values of class variable 80 are further constrained based on the values that are represented in item column 225a. If a cell in item column 225a contains labor item 100, then the corresponding cell in class column 225b may only contain labor classification 120. Similarly, if a cell in item column 225a contains equipment item 105, material item 110, or expense item 115, then the corresponding cell in class column 225b may only contain equipment classification 125, material classification 130, or expense classification 135, respectively.

As shown in area 275, there may be one or more cells representing labor classification 120 in class column 225b to the right of a cell in item column 225a containing labor item 100. Labor classification 120 may contain optional sub-item 140, such as sub-item 280. Each cell containing sub-item 140 represents the values of sub-item 140 with a graphical icon and a textual description. Cells containing optional sub-item 140 are constrained such that they may only contain references to equipment item 105, material item 110, or expense item 115. These cells are also constrained such that a value for a given sub-item is not repeated.

Further, cells containing optional sub-item 140 are only permitted inside of cells in class column 225b containing labor classification 120. There may be only one cell in class column 225b containing equipment classification 125, material classification 130, or expense classification 135 to the right of a cell containing equipment item 105, material item 110, or expense item 115, respectively.

Context 60 dimension work variable 85 is displayed to the immediate right of class column 225b at work column 225c. Each cell in work column 225c represents the value of work variable 85 using the combination of an icon and a textual description. The values of work variable 85 in work column 225c are constrained such that they may only contain references to work objects. The values of work variable 85 are also constrained such that the same value cannot be repeated within the set of cells that is to the right of a class or sub-item cell in class column 225b. Further, there may be one or more cells to represent work variable 85 to the right of every class or sub-item cell in class column 225b.

Finally, context 60 dimension reference variable 90 is displayed at reference column 225d to the immediate right of work column 225c and context 60 dimension unit variable 95 is displayed at unit column 225e to the immediate right of reference column 225d. Each cell in unit column 225e represents the value of unit variable 95 using a textual description. The value of unit variable 95 is constrained such that it may only contain references to unit objects. The value of unit variable 95 is also constrained such that the same value cannot be repeated within the set of cells that is to right of cells in work column 225c. As shown in unit column 225e, there can be one or more cells to the right of every cell in work column 225c.

At the bottom of contextual dimensions area 175 is fixed footer 195 that contains one row for each distinct item variable 75 that is referenced in item column 225a. These rows are labeled with a static item type, which can either be labor item 100, equipment item 105, material item 110, or expense item 115, and a dynamically calculated count of how many items of the specific type presently occupy cells within item column 225a.

Quantities that are recorded for item variable 75 in item column 225a are shown in horizontally scrolling area 180. Each column in area 180 represents a specific date. Dates are statically labeled at the top of each column and arranged from left to right in consecutive order. Each cell in these columns represents a single event by displaying a quantity and intersecting a specific context, as defined by the contextual cells that are adjacent and to the immediate left, and a specific date. Subtotals are automatically calculated for each row and displayed on the right hand side of EVM display 145. Subtotals are also calculated for each column for each distinct item type and displayed at the bottom of EVM display 145. Finally, subtotals are calculated within each column once for each distinct cell in item column 225a.

It should be understood by one skilled in the art that the above mentioned constraints prevent values from being unnecessarily repeated between rows. Where a value is constant between rows, the cell containing the value is expanded vertically to span across all of the rows sharing the common value. In addition to preventing the redundant display of information, this functionality also uses the extra vertical display space to display an extended textual description enhancing the overall legibility of the display. It will be further appreciated that the nested sub-item behavior also contributes to the overall conservation of display space by using a single column to represent multiple contextual dimensions.

Referring now to FIG. 6, an exemplary view of EVM navigational controls for selecting dates is described. Navigational controls 285 at the top of EVM display 190 enable users to set the first date of the column range by either typing in a specific date or selecting a date from a calendar. Navigational controls 285 also enable an user to page through consecutive sets of dates in either forward or reverse order.

Referring now to FIG. 7, an exemplary view of EVM navigational controls for selecting different views for dates is described. Navigational controls 295 at the top of EVM display 300 enables an user to switch between alternate view configurations. To support different usage patterns, certain parameters in EVM display screen 300 such as view configurations for dates may be configurable by the user via an external screen. The number of days to be displayed can range between one and seven. When an user selects seven days, they can also select which day of the week, Sunday through Saturday, the user wishes to always see as the leftmost day column. Different configurations of these parameters can be saved in the MDB and assigned a descriptive name so that they can be conveniently recalled by an user using a simple navigational control.

Referring now to FIG. 8, an exemplary view of EVM navigational controls for selecting workgroups is described. Navigational controls 305 of EVM display 310 enable users to select a workgroup based on a descriptive name, such as "Crew 1" and "Crew 2". Users may select a workgroup to edit and review events for arbitrary periods in time.

Figure 9:
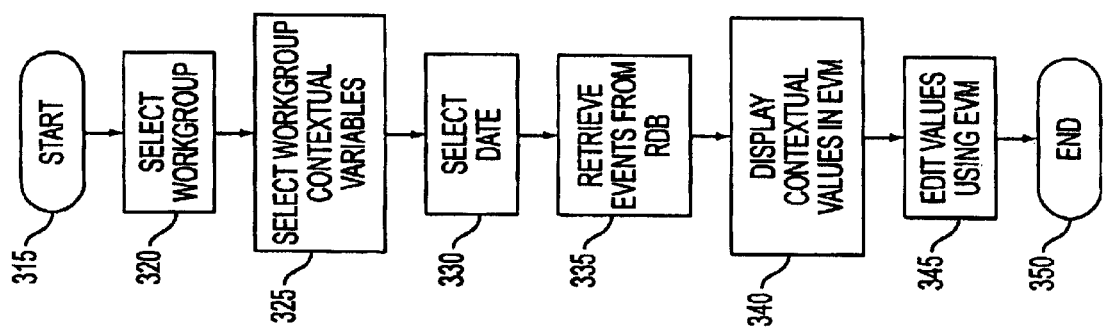
FIG. 9 is a flow chart for editing data saved in the MDB by selecting a workgroup.

Referring now to FIG. 9, a flow chart for editing data saved in the MDB by selecting a workgroup is described. The editing process begins at step 320 with the user using navigational controls 305 to select a workgroup to edit. Once a workgroup is selected, its contextual variables are examined at step 325 and used to prepare a query to retrieve event data with. At step 330, the user uses navigational controls 285 (FIG. 6) and 295 (FIG. 7) to select a data range for editing the contextual variables in the selected workgroup for a particular date.

Specifically, the values of item variable 75 of the selected workgroup are used in conjunction with the date range selected by the user to form a query that retrieves from the MDB (step 335) all events that reference any of the items in item variable 75 of the selected workgroup and reference a date within the selected date range. The retrieved events are sorted and rendered such that they conform to the dimension constraints previously described. Next, any combination of contextual values that is stored in the selected workgroup, but returned no events are also merged into the display. At step 340, the contextual values are displayed in the EVM. Once the values are displayed, the user may edit the values at step 345.

For example, if an user selects the workgroup referred to as "crew 1" shown in FIG. 8, EVM display 305 will first be erased and then the values of item variable 75 corresponding to crew 1 will populate EVM display 305 for a date selected for display by the user. Once the workgroup and date have been set and the MDB query has executed, returned and rendered on EVM display 305, the user may edit the values shown in EVM display 305. Editing operations include adding or removing values within contextual dimensions and entering or deleting quantities.

Figure 10:
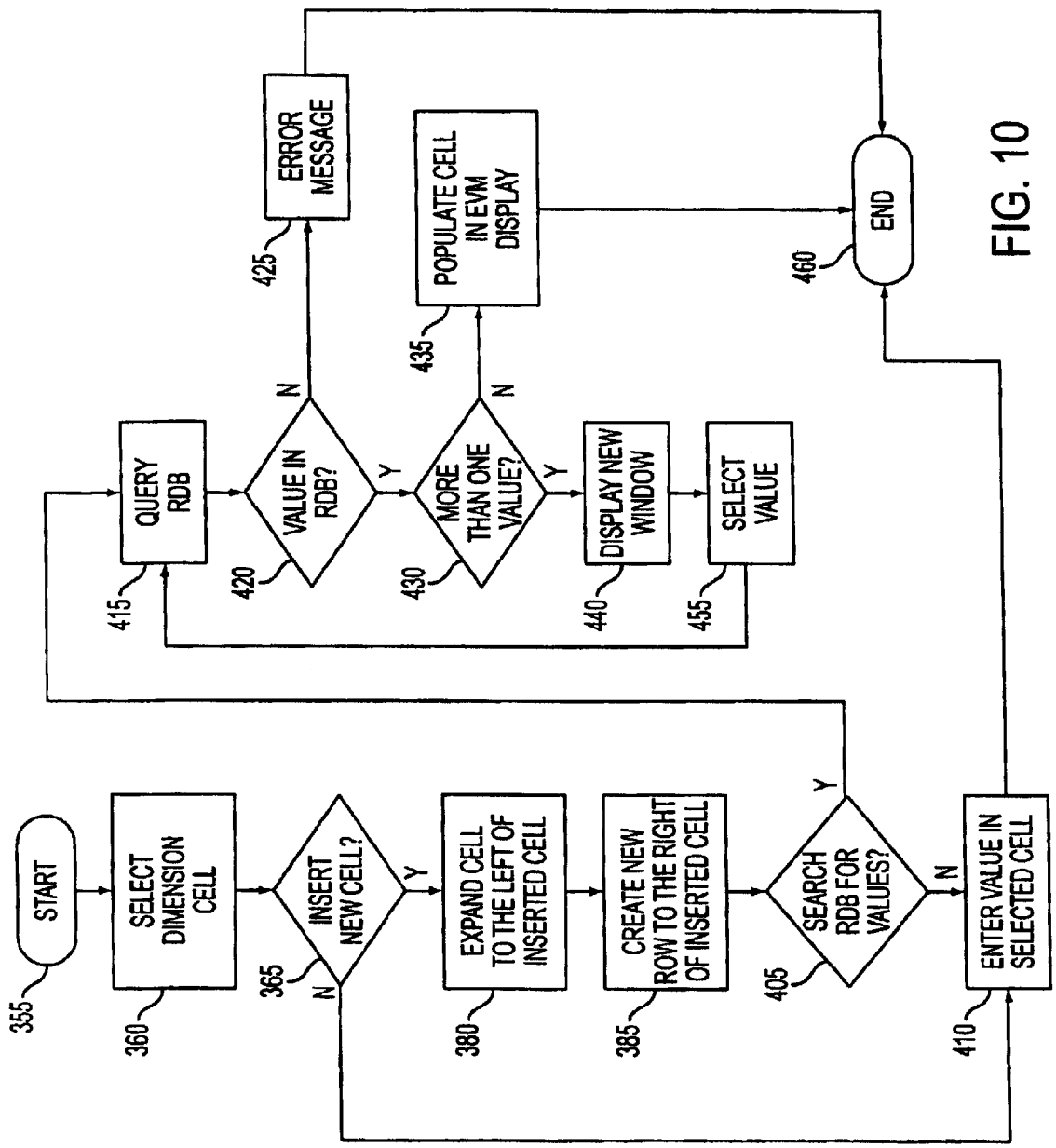
FIG. 10 is a flow chart for adding a new contextual dimension value to the MDB through an EVM display.

Referring now to FIG. 10, a flow chart for adding a new contextual dimension value to the MDB through the EVM is described. To add a value to a contextual dimension, the user must first select a target dimension cell at step 360 using either the mouse or the keyboard. Once a cell has been selected, the user can either enter a new value into the selected cell, or insert a new cell either above or below the existing cell using the keyboard (step 365). If a new cell is inserted such as cell 370 in EVM display 375 shown in FIG. 11, the cell to the immediate left is expanded at step 380 such that it vertically spans all the cells it spanned prior to the insertion plus the newly inserted cell. A new row of dimension and quantity cells is then created to the right of the newly inserted cell at step 385. For example, cell 390 (FIG. 8) is expanded to cell 395 to the left of inserted cell 370 and row 400 is added to the right of inserted cell 370 (FIG. 11).

When entering values into contextual dimensions using the keyboard, the user has the option of either entering a specific object code or a search string to locate the object of interest. That is, the user has the option to search the MDB for the values to be added (step 405). Alternatively, once the new cell has been inserted and selected, a new value can be entered into the cell using the keyboard at step 410.

If the user enters a specific object code at step 405, a MDB query is performed at step 415 to determine whether the object exists in the MDB or not (step 420). If the object exists, the cell is populated with a reference to its value and the display is updated at step 435. If the object does not exist an error message is displayed to the user at step 425. If the user enters a search string to locate the object at step 405, a MDB query is performed at step 415 to find all objects that match the search string. If a single object is returned by the query, the cell is populated with a reference to its value and the display is updated at step 435.

Figure 12:
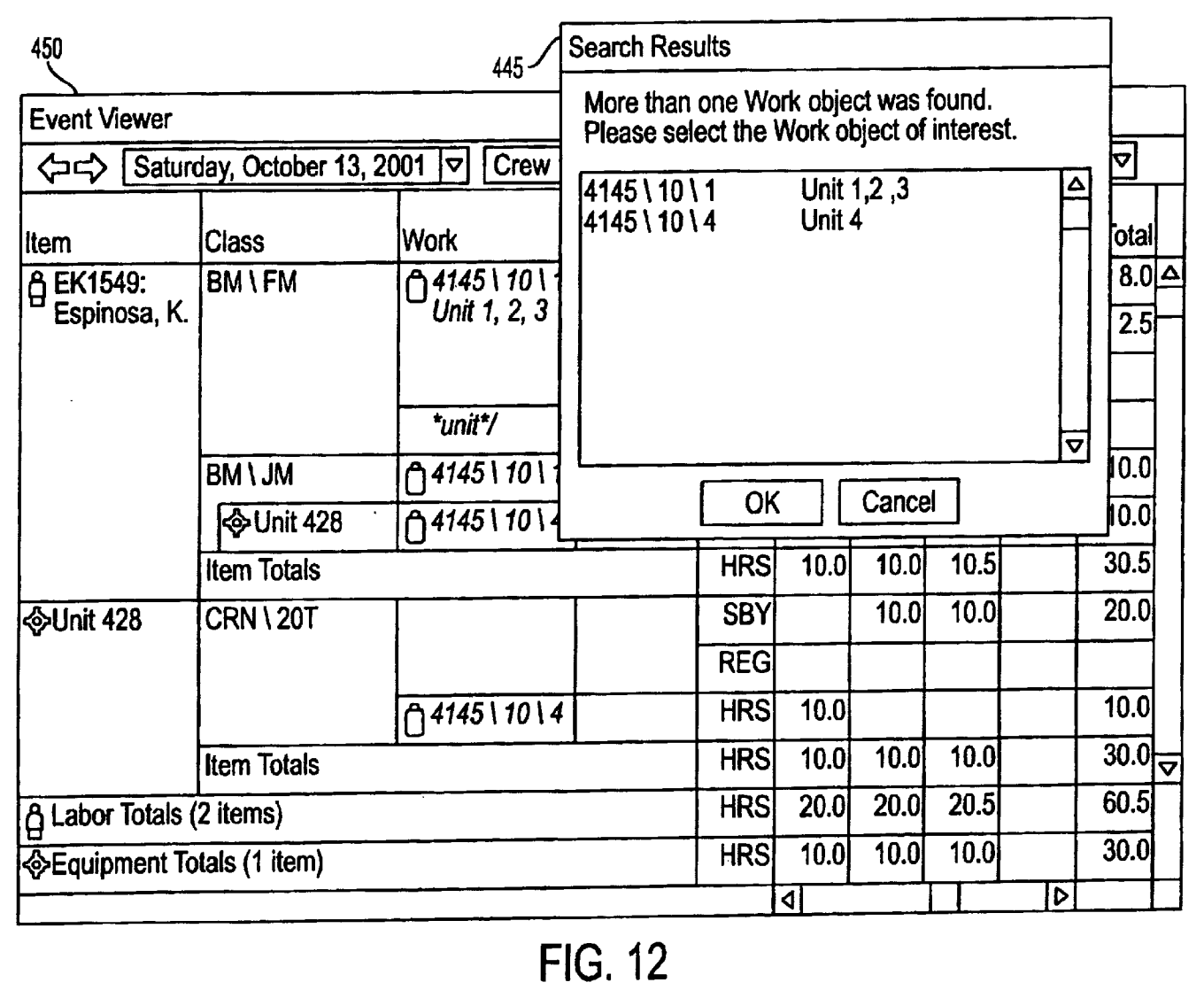

If more than one object is returned by the query (step 430), the user is presented with a new window at step 440 that displays a scrollable list of all the objects for the user to select from. An example of such a window is window 445 in EVM display 450 shown in FIG. 12. Once a selection is made (step 455), if the MDB query (step 415) doesn't return a match, an error message is displayed to the user at step 425. Otherwise, the cell is populated with a reference to its value and the display is updated at step 435.

It should be understood by one skilled in the art that alternate methods such as drag and drop could be implemented to add objects to contextual dimensions within a given EVM display.

Figure 13:
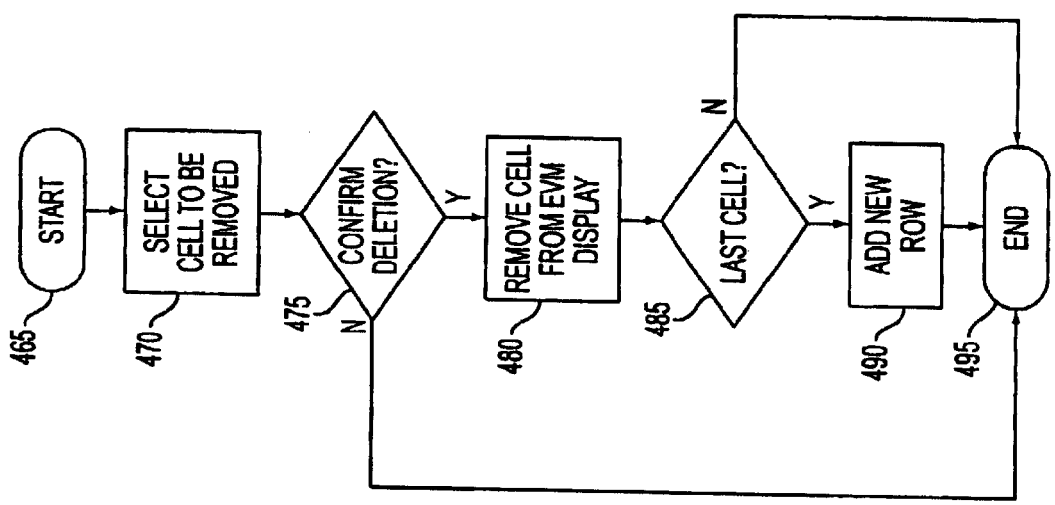
FIG. 13 is a flow chart for removing a contextual dimension value from an EVM display.

Referring now to FIG. 13, a flow chart for removing a contextual dimension value from an EVM display is described. To remove a value, the user selects the cell to be removed at step 470 and presses an appropriate key on the keyboard. The user is next prompted to confirm their intention to delete the value (step 475). Once the user has confirmed their intention to delete the value, the cell is removed from the display at step 480 along with all cells to the right of the selected cell. If the cell being removed is not an item cell and is the last cell in the set of cells to the right of another dimension cell (step 485), a new row of empty dimension cells and quantity cells is created and displayed at step 490.

Referring now to FIG. 14, an exemplary view of an EVM display for removing a contextual dimension value is described. EVM display 495 shows that the values in cell 500 (FIG. 8) and in all the cells to the right of cell 500 have been removed. New row 505 has been created to contain empty dimension and quantity cells.

Figure 15:
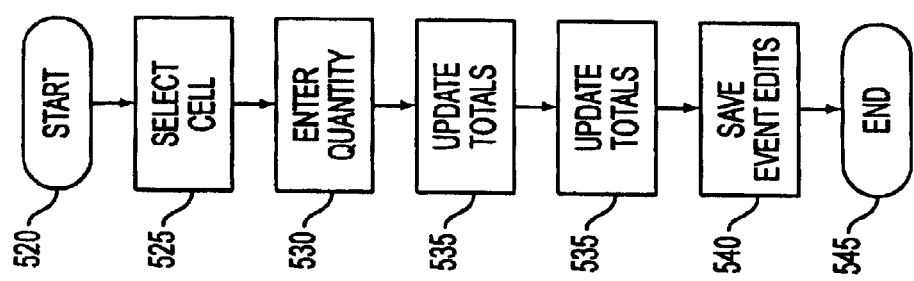
FIG. 15 is a flow chart for entering a new quantity in an EVM display.

Referring now to FIG. 15, a flow chart for entering a new quantity in an EVM display is described. Once contextual dimensions have been assigned values by the user, quantities are then populated under specific intersections of context and date. To enter a quantity, such as quantity 510 in EVM display 515 shown in FIG. 16, the user selects a cell at step 525 that is to the right of the desired context and below the desired date. Once the cell has been selected, the user then enters a quantity using the keyboard (step 530). After a quantity has been entered or edited, all row totals, item sub-totals and column totals are automatically updated at step 535 to reflect the changes. After context and quantities have been entered, the user saves the event edits to the MDB at step 540 by selecting a command from a menu, by changing the workgroup selection or by changing the date selection.

Although particular embodiments of the present invention have been described above in detail, it will be understood that this description is merely for purposes of illustration. Specific features of the invention are shown in some drawings and not in others, for purposes of convenience only, and any feature may be combined with other features in accordance with the invention. Steps of the described processes may be reordered or combined, and other steps may be included. Further variations will be apparent to one skilled in the art in light of this disclosure and such variations are intended to fall within the scope of the appended claims.

What is claimed is:

1. A method for representing, editing, and operating on multi-dimensional data efficiently without requiring extensive user training, the method comprising:

providing a multi-dimensional database to store the multi-dimensional data;

providing an event-based tree data structure to represent the multi-dimensional data as events having a context represented by a set of reference variables;

providing a graphical user interface to display the multi-dimensional data with textual descriptions and easily recognizable graphical icons in a display area for representing, editing, and operating on the set of reference variables; and constraining the display of the multi-dimensional data within designated cells in the graphical user interface to eliminate display repetition of multi-dimensional data by vertically expanding the display area for representing, editing, and operating on a first reference variable to associate the first reference variable to multiple values of a second reference variable.

2. The method of claim 1, wherein providing a multi-dimensional database to store the multi-dimentional data comprises providing a multi-dimensional database to store data pertaining to the allocation of labor, equipment, and material to project cost centers in business, educational, non-profit, and governmental organizations.

3. The method of claim 1, wherein providing an event-based tree data structure to represent the multi-dimensional data as events having a context represented by a set of reference variables comprises representing the context using a set of reference variables selected from the group comprising of: an item variable; a class variable; a work variable; a reference variable; and a unit variable.

4. The method of claim 3, wherein representing the context using an item variable comprises representing the context using one or more of: a labor item; an equipment item; a material item; and an expense item.

5. The method of claim 3, wherein representing the context using a class variable comprises representing the context using one or more of: a labor classification; an equipment classification; a material classification; and an expense classification.

6. The method of claim 3, wherein representing the context using a set of reference variables comprises representing the context using a descriptive workgroup name to identify one or more combinations of: an item variable; a class variable; a work variable; a reference variable; and a unit variable.

7. The method of claim 1, wherein providing a graphical user interface to display the multi-dimensional data with textual descriptions and easily recognizable graphical icons comprises providing an event viewer module to enable user to add or remove values for the set of reference variables representing a context.

8. The method of claim 1, wherein providing a graphical user interface to display the multi-dimensional data with textual descriptions and easily recognizable graphical icons comprises providing an event viewer module to enable user to add or remove quantities associated with a context.

9. The method of claim 1, further comprising automatically saving edits on an event with the graphical user interface into the multi-dimensional database.

10. The method of claim 1, wherein providing a graphical user interface to display the multi-dimensional data with textual descriptions and easily recognizable graphical icons comprises providing a display area for representing, editing, and operating on quantities associated with a context.

11. The method of claim 1, wherein providing a graphical user interface to display the multi-dimensional data with textual descriptions and easily recognizable graphical icons comprises providing a display area to display totals for quantities associated with a context.

12. The method of claim 1, wherein providing a graphical user interface to display the multi-dimensional data with textual descriptions and easily recognizable graphical icons comprises providing navigational controls for selecting dates associated with a context.

13. The method of claim 1, wherein providing a graphical user interface to display the multi-dimensional data with textual descriptions and easily recognizable graphical icons comprises providing navigational controls for selecting workgroups.

14. The method of claim 1, wherein providing a graphical user interface to display the multi-dimensional data with textual descriptions and easily recognizable graphical icons comprises providing navigational controls for selecting date view configurations.

15. The method of claim 1, wherein providing a graphical user interface to display the multi-dimensional data comprises providing a graphical user interface for editing the multi-dimensional data by selecting a workgroup.

16. The method of claim 1, wherein providing a graphical user interface to display the multi-dimensional data comprises providing a graphical user interface for adding a new value corresponding to a reference variable.

17. The method of claim 1, wherein providing a graphical user interface to display the multi-dimensional data comprises providing a graphical user interface for removing a value corresponding to a reference variable.

18. The method of claim 1, wherein providing a graphical user interface to display the multi-dimensional data comprises providing a graphical user interface for adding a new quantity corresponding to a reference variable.

19. The method of claim 1, wherein constraining the display of the multi-dimensional data within designated cells in the graphical user interface to eliminate display repetition of multi-dimensional data comprises constraining the display of an item variable to a labor item associated with a labor classification representing a class variable.

20. The method of claim 1, wherein constraining the display of the multi-dimensional data within designated cells in the graphical user interface to eliminate display repetition of multi-dimensional data comprises constraining the display of an item variable to an equipment item associated with an equipment classification representing a class variable.

21. The method of claim 1, wherein constraining the display of the multi-dimensional data within designated cells in the graphical user interface to eliminate display repetition of multi-dimensional data comprises constraining the display of an item variable to a material item associated with a material classification representing a class variable.

22. The method of claim 1, wherein constraining the display of the multi-dimensional data within designated cells in the graphical user interface to eliminate display repetition of multi-dimensional data comprises constraining the display of an item variable to an expense item associated with an expense classification representing a class variable.

23. A system for representing, editing, and operating on multi-dimensional data efficiently without requiring extensive user training, the system comprising:
  a multi-dimensional database to store the multi-dimensional data;
  an event-based tree data structure to represent the multi-dimensional data in the multi-dimensional database as events having a context represented by a set of reference variables; and
  a graphical user interface to display the multi-dimensional data with textual descriptions and easily recognizable graphical icons in a display area for representing, editing, and operating on the set of reference variables, wherein the multi-dimensional data are constrained to designated cells in the graphical user interface to eliminate display repetition of multi-dimensional data by vertically expanding the display area for representing, editing, and operating on a first reference variable to associate the first reference variable to multiple values of a second reference variable.

24. The system of claim 23, wherein the multi-dimensional data comprises data pertaining to the allocation of labor, equipment, and material to project cost centers in business, educational, non-profit, and governmental organizations.

25. The system of claim 23, wherein the event-based tree data structure comprises a tree root representing an event.

26. The system of claim 23, wherein the event-based tree data structure comprises a tree branch from the tree root to a tree node representing a context.

27. The system of claim 23, wherein the set of reference variables comprises one or more of: an item variable; a class variable; a work variable; a reference variable; and a unit variable.

28. The system of claim 27, wherein the item variable comprises one or more of: a labor item; an equipment item; a material item; and an expense item.

29. The system of claim 27, wherein the class variable comprises one or more of: a labor classification; an equipment classification; a material classification; and an expense classification.

30. The system of claim 29, wherein the labor classification comprises a sub-item.

31. The system of claim 30, wherein the sub-item comprises one or more of: an equipment item; a material item; and an expense item.

32. The system of claim 27, wherein the display of an item variable is constrained to a labor item associated with a labor classification representing a class variable.

33. The system of claim 27, wherein the display of an item variable is constrained to an equipment item associated with an equipment classification representing a class variable.

34. The system of claim 27, wherein the display of an item variable is constrained to a material item associated with a material classification representing a class variable.

35. The system of claim 27, wherein the display of an item variable is constrained to an expense item associated with an expense classification representing a class variable.

36. The system of claim 23, wherein the set of reference variables comprises a descriptive workgroup name to identify one or more combinations of: an item variable; a class variable; a work variable; a reference variable; and a unit variable.

37. The system of claim 23, wherein the graphical user interface comprises an event viewer module to enable &n user to add or remove values for the set of reference variables representing a context.

38. The system of claim 23, wherein the graphical user interface comprises an event viewer module to enable user to add or remove quantities associated with a context.

39. The system of claim 23, wherein the event viewer module automatically saves edits on an event with the graphical user interface into the multi-dimensional database.

40. The system of claim 23, wherein the graphical user interface comprises a display area for representing, editing, and operating on quantities associated with a context.

41. The system of claim 23, wherein the graphical user interface comprises a display area to display totals for quantities associated with a context.

42. The system of claim 23, wherein the graphical user interface comprises navigational controls for selecting dates associated with a context.

43. The system of claim 23, wherein the graphical user interface comprises navigational controls for selecting workgroups.

44. The system of claim 23, wherein the graphical user interface comprises navigational controls for selecting date view configurations.

* * * * *

UNITED STATES PATENT AND TRADEMARK OFFICE
CERTIFICATE OF CORRECTION

PATENT NO. : 6,839,719 B2
DATED : January 4, 2005
INVENTOR(S) : Wallace

It is certified that error appears in the above-identified patent and that said Letters Patent is hereby corrected as shown below:

Title page,
Item [56], References Cited, OTHER PUBLICATIONS,
Delete "Wang, J. and Bartholomew, C.H.," reference.
"Oracle" reference, insert -- " -- before "Oracle 9i Database…"; and insert -- " -- after "Family,".

Drawings,
Sheet 14, Figure 14, "40" should be -- 40.0 -- under "Total" in "Labor Totals" row.

Column 13,
Line 45, "multi-dimentional" should be -- multi-dimensional --.

Column 16,
Line 29, replace "&n" with -- a --.
Line 33, insert -- a -- before "user".

Signed and Sealed this

Twenty-seventh Day of September, 2005

JON W. DUDAS
*Director of the United States Patent and Trademark Office*